US010697403B2

United States Patent
Ishikawa et al.

(10) Patent No.: US 10,697,403 B2
(45) Date of Patent: Jun. 30, 2020

(54) EXHAUST HEAT RECOVERY DEVICE (71) Applicant: FUTABA INDUSTRIAL CO., LTD., Okazaki-shi, Aichi (JP)

(72) Inventors: Hiromi Ishikawa, Okazaki (JP); Naohiro Takemoto, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 111 days.

(21) Appl. No.: 15/761,364

(22) PCT Filed: Feb. 15, 2016

(86) PCT No.: PCT/JP2016/054335
§ 371 (c)(1),
(2) Date: Mar. 19, 2018

(87) PCT Pub. No.: WO2017/141330
PCT Pub. Date: Aug. 24, 2017

(65) Prior Publication Data
US 2018/0266368 A1    Sep. 20, 2018

(51) Int. Cl.
*F02M 26/27*    (2016.01)
*F01N 3/24*    (2006.01)
(Continued)

(52) U.S. Cl.
CPC ............... *F02M 26/27* (2016.02); *F01N 3/24* (2013.01); *F01N 5/02* (2013.01); *F02M 26/16* (2016.02);
(Continued)

(58) Field of Classification Search
CPC .......... F01N 3/0205; F01N 3/046; F01N 3/24; F01N 5/02; F01N 2240/02; F01N 3/04;
(Continued)

(56) References Cited

U.S. PATENT DOCUMENTS 7,896,065 B2 *    3/2011   Augenstein ............... F28F 9/02
                                                              165/174
8,266,900 B2 *    9/2012   Shikazono ................ F01N 5/02
                                                              165/102
(Continued)

FOREIGN PATENT DOCUMENTS

EP    2910885 A1    8/2015
JP    2012057573 A    3/2012
(Continued)

OTHER PUBLICATIONS

First Notification of Office Action for Chinese Patent Application No. 201680055018.9 dated Jul. 16, 2019, 18 pages including English translation.
(Continued)

*Primary Examiner* — Eric S Ruppert
*Assistant Examiner* — Hans R Weiland
(74) *Attorney, Agent, or Firm* — Withrow & Terranova, P.L.L.C.; Vincent K. Gustafson (57) ABSTRACT

An exhaust heat recovery device according to one aspect of the present disclosure includes a heat exchanger, a supply flow path, and a discharge flow path. The heat exchanger has a plurality of heat exchange flow paths configured to carry out heat exchange between exhaust gas and a heat exchange medium. The supply flow path is configured such that the exhaust gas flows therethrough, and the flowing exhaust gas is supplied to the plurality of heat exchange flow paths while being branched. The discharge flow path is configured to merge and discharge the heat-exchanged exhaust gas having passed through the plurality of heat exchange flow paths. At least one flow path of the supply flow path and the discharge flow path is configured to be narrower toward a downstream side in a flow direction of the exhaust gas.

6 Claims, 6 Drawing Sheets (51) Int. Cl.
  *F01N 5/02* (2006.01)
  *F02M 26/16* (2016.01)
  *F02M 26/30* (2016.01)
  *F02M 26/31* (2016.01)
(52) U.S. Cl.
  CPC ............ *F02M 26/30* (2016.02); *F02M 26/31* (2016.02); *F01N 2240/02* (2013.01)
(58) Field of Classification Search
  CPC ........ F01N 3/043; F20M 26/25; F20M 26/27; F20M 26/28; F20M 26/29; F20M 26/30; F20M 26/31; F20M 26/32; F28D 21/0003; F28F 9/0243; F28F 9/0263; F28F 2009/029
  See application file for complete search history.

(56) References Cited

U.S. PATENT DOCUMENTS

| | | | | |
|---|---|---|---|---|
| 8,522,537 | B2* | 9/2013 | Lee | F01M 5/001 60/298 |
| 9,027,326 | B2* | 5/2015 | Martin | F01N 5/02 60/287 |
| 2003/0111209 | A1* | 6/2003 | Tsujita | F28D 7/1653 165/51 |
| 2007/0289581 | A1* | 12/2007 | Nakamura | F28D 9/0025 123/568.12 |
| 2010/0199955 | A1* | 8/2010 | Smith | F28F 9/0263 123/542 |
| 2013/0199288 | A1* | 8/2013 | Goenka | F28F 9/0263 73/202 |
| 2015/0218997 | A1* | 8/2015 | Kato | F01N 5/02 165/103 |
| 2015/0241138 | A1 | 8/2015 | Veitch | |

FOREIGN PATENT DOCUMENTS

| | | |
|---|---|---|
| JP | 2014088789 A | 5/2014 |
| JP | 2015021432 A | 2/2015 |

OTHER PUBLICATIONS

International Search Report for International Patent Application No. PCT/JP2016/054335 (Form PCT/ISA/210), dated May 10, 2016 (1 page).

Notification of Reasons for Refusal for Japanese Patent Application No. 2017-567592 dated Sep. 4, 2018 (6 pages including English machine translation).

Notification of Transmittal of Translation of the International Preliminary Report on Patentability (Form PCT/IB/338), International Preliminary Report on Patentability under Chapter I PCT (Form PCT/IB/373), and Translation of Written Opinion of the International Searching Authority (PCT/ISA/237), for International Patent Application No. PCT/JP2016/054335, dated Aug. 30, 2018 (8 pages).

* cited by examiner

EXHAUST HEAT RECOVERY DEVICE

CROSS-REFERENCE TO RELATED APPLICATION(S)

This application is a 35 U.S.C. § 371 national phase filing of International Application No. PCT/JP2016/054335 filed Feb. 15, 2016, wherein the disclosure of the foregoing application is hereby incorporated by reference herein in its entirety.

TECHNICAL FIELD

The present disclosure relates to a technique for recovering heat from exhaust gas using a heat exchanger.

BACKGROUND ART

The following Patent Document 1 discloses an exhaust heat recovery device in which a member having holes of different sizes is disposed at an inlet of a heat exchanger so as to regulate the flow rate of exhaust gas flowing into a plurality of heat exchange flow paths in the heat exchanger.

PRIOR ART DOCUMENTS

Patent Documents

Patent Document 1: Japanese Unexamined Patent Application Publication No. 2015-021432

SUMMARY OF THE INVENTION

Problems to be Solved by the Invention

However, in the above exhaust heat recovery device, since a new member for regulating the flow rate of the exhaust gas is disposed in front of the plurality of heat exchange flow paths, there is a problem that the configuration becomes complicated and the cost increases.

In one aspect of the present disclosure, it is desirable that an amount of exhaust gas flowing into a cell of a heat exchanger can be optimized with a simple configuration.

Means for Solving the Problems

An exhaust heat recovery device according to one aspect of the present disclosure comprises a heat exchanger, a supply flow path, and a discharge flow path. The heat exchanger has a plurality of heat exchange flow paths configured to carry out heat exchange between exhaust gas and a heat exchange medium. The supply flow path is configured such that the exhaust gas flows therethrough, and the flowing exhaust gas is supplied to the plurality of heat exchange flow paths while being branched.

The discharge flow path is configured to merge and discharge the heat-exchanged exhaust gas having passed through the plurality of heat exchange flow paths. At least one of the supply flow path and the discharge flow path is configured to be narrower toward a downstream side in a flow direction of the exhaust gas.

According to such an exhaust heat recovery device, in at least one of the supply flow path and the discharge flow path, the cross-sectional area of the flow path is set to be smaller toward the downstream side in the flow direction of the exhaust gas, and therefore, for example, as compared with a case where the cross-sectional area of the flow path is set uniformly, a flow rate difference of the exhaust gas flowing through the plurality of heat exchange flow paths can be reduced. Thus, the amount of the exhaust gas flowing into a cell of the heat exchanger can be optimized with a simple configuration.

Further, in the exhaust heat recovery device according to one aspect of the present disclosure, the cross-sectional area of the supply flow path may be narrower toward the downstream side in the flow direction of the exhaust gas.

According to such an exhaust heat recovery device, the amount of the exhaust gas flowing into the cell of the heat exchanger can be reliably optimized with a simple configuration.

Further, in the exhaust heat recovery device according to one aspect of the present disclosure, the flow direction of the exhaust gas in the supply flow path may be set to the same direction as the flow direction of the exhaust gas in the discharge flow path.

According to such an exhaust heat recovery device, resistance to the flow generated when the flow direction of the exhaust gas is changed can be minimized as much as possible.

The exhaust heat recovery device according to one aspect of the present disclosure may further comprise a wall portion configured to sandwich at least one flow path of the supply flow path and the discharge flow path and face the plurality of heat exchange flow paths, and a cross section of the wall portion when the wall portion is cut on a virtual plane including the at least one flow path and the plurality of heat exchange flow paths may be provided with a linear portion configured to extend linearly.

According to such an exhaust heat recovery device, it is possible to facilitate design and processing in the linear portion.

The exhaust heat recovery device according to one aspect of the present disclosure may further comprise a wall portion configured to sandwich at least one flow path of the supply flow path and the discharge flow path and face the plurality of heat exchange flow paths, and a cross section of the wall portion when the wall portion is cut on a virtual plane including the at least one flow path and the plurality of heat exchange flow paths may be provided with a curved portion configured to extend in a curved shape.

According to such an exhaust heat recovery device, the curved portion is set according to the flow characteristics of the exhaust gas, whereby the flow rate of the exhaust gas flowing through the plurality of heat exchange flow paths can be made more uniform.

The exhaust heat recovery device according to one aspect of the present disclosure may further comprise a main flow path through which the exhaust gas flows. The supply flow path and the heat exchanger may be arranged to surround a circumference of the main flow path and may be configured to allow introduction of at least a portion of the exhaust gas flowing through the main flow path.

According to such an exhaust heat recovery device, it is possible to achieve a structure in which at least a portion of the exhaust gas flowing through the main flow path flows through the heat exchanger.

EXPLANATION OF REFERENCE NUMERALS

1 . . . exhaust heat recovery device, 2 . . . exhaust portion, 4 . . . shell member, 8 . . . inflow portion, 10 . . . valve, 12 . . . exhaust pipe, 14 . . . exhaust pipe, 16 . . . upstream end, 20 . . . outer shell member, 20A, 24A . . . linear portion, 22 . . . lid member, member, 24 . . . holding member, 24B, 24C . . . curved portion, 28 . . . heat exchange chamber, 30 . . . heat exchanger, 32 . . . heat exchange flow path, 34 . . . heat exchange cell, 38 . . . supply flow path, 40 . . . discharge flow path, 44 . . . inflow pipe, 46 . . . outflow pipe, 56 . . . valve seat support member, 58 . . . distal end portion, 62 . . . valve body, 64 . . . valve seat, 66 . . . valve shaft, 68 . . . mesh member, 70 . . . main flow path, 71 . . . secondary flow path, 142 . . . exhaust gas, 144 . . . heat exchange medium, 241 . . . linear portion, 242 . . . curved portion Mode for Carrying Out the Invention Hereinafter, exemplary embodiments of the present disclosure will be described with reference to the drawings.

[1-1. Overview of Exhaust Heat Recovery Device]

Figure 1:
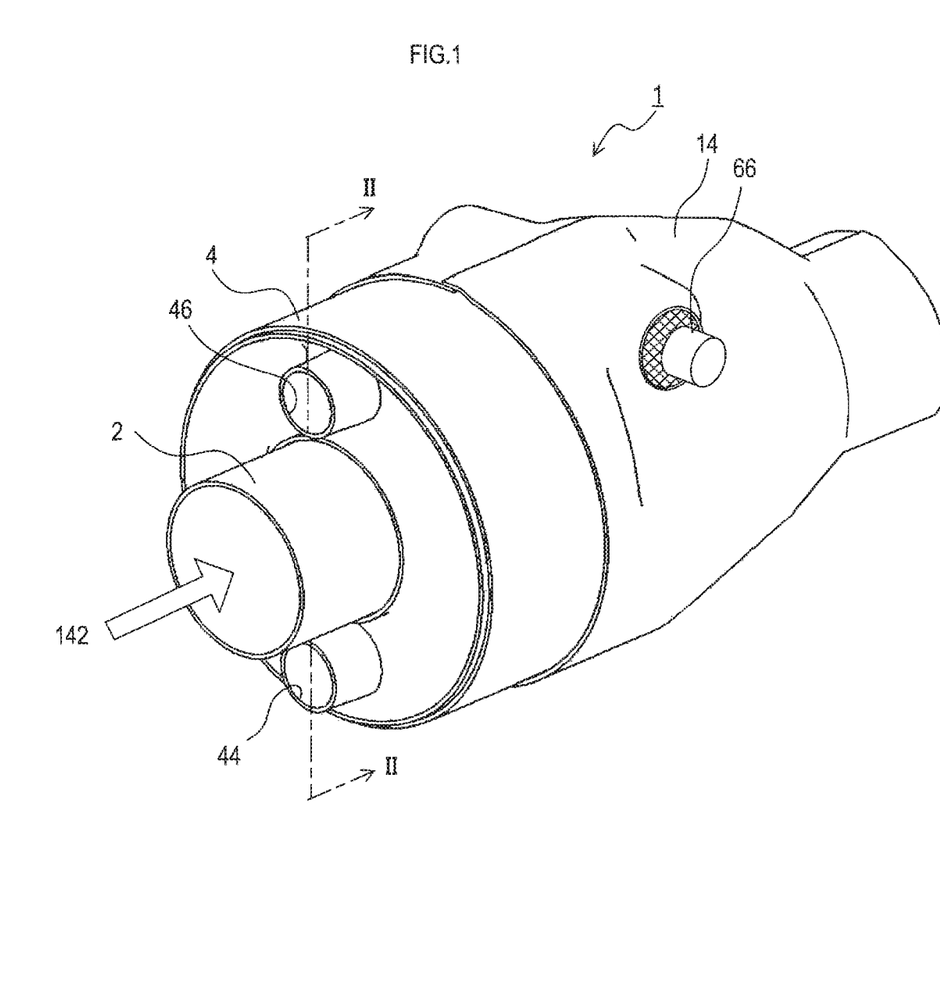
FIG. 1 is a perspective view showing an appearance of an exhaust heat recovery device according to an embodiment.
Figure 2:
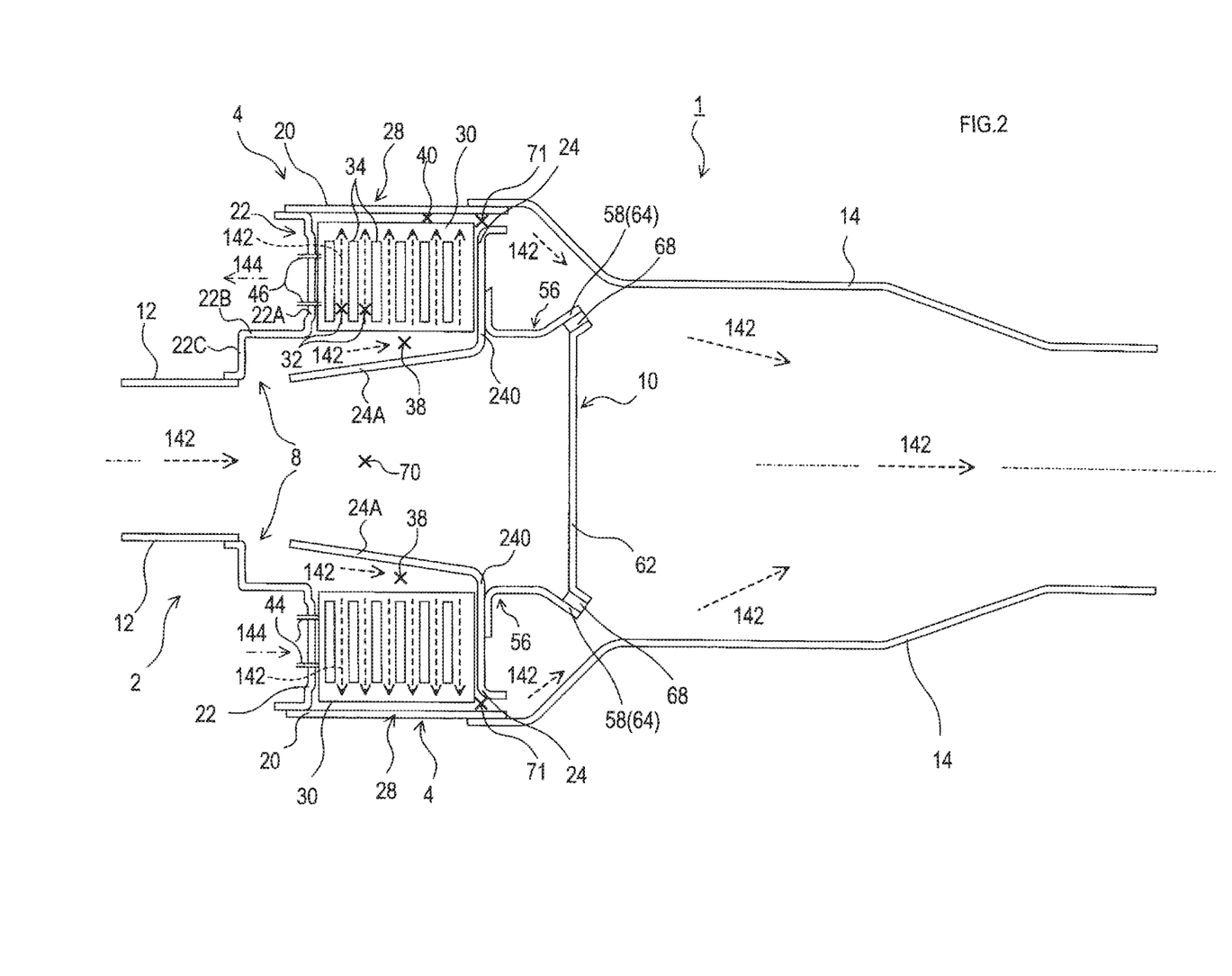
FIG. 2 is a cross-sectional view of the exhaust heat recovery device in a valve-closed state, taken along the line II-II in FIG. 1.

An exhaust heat recovery device 1 shown in FIGS. 1 and 2 is installed in a moving object having an internal combustion engine, such as a passenger car. The exhaust heat recovery device 1 recovers heat from exhaust gas 142, such as exhaust gas from an internal combustion engine, which is a high temperature fluid, by transferring heat of the exhaust gas 142 to a heat exchange medium 144. The heat exchange medium is a fluid for cooling the exhaust gas 142 and represents a fluid having a lower temperature than the exhaust gas 142. The heat exchange medium 144 in the present embodiment may be cooling water in an internal combustion engine, an oil liquid, or a gas.

The exhaust heat recovery device 1 of the present embodiment comprises an exhaust portion 2, a shell member 4, a heat exchange unit 30, and a valve 10.

The exhaust portion 2 forms a flow path that guides the exhaust gas 142 from the internal combustion engine to the downstream side. In the following description, the downstream side in the main flow direction of the exhaust gas 142 is simply referred to as "downstream side", and the upstream side in the main flow direction of the exhaust gas 142 is simply referred to as "upstream side". The main flow direction of the exhaust gas 142 or the flow direction of the exhaust gas indicates not the microscopic flow direction of the exhaust gas 142 but the flow direction of the exhaust gas 142 as a whole.

The shell member 4 is a member covering outside of the exhaust portion 2. The heat exchanger 30 is disposed between the exhaust portion 2 and the shell member 4 and exchanges heat between the exhaust gas 142 and the heat exchange medium 144. The valve 10 is a valve that opens or closes the flow path for the exhaust gas 142 and is located downstream of the inflow portion 8, to be described below, along the flow path for the exhaust gas 142 in the exhaust portion 2.

When the valve 10 is opened, most of the exhaust gas 142 does not pass through the heat exchanger 30 but passes through a main flow path 70 to flow downstream of the valve 10. When the valve 10 is closed, most of the exhaust gas 142 passes through a secondary flow path 71 passing through the heat exchanger 30 to flow downstream of the valve 10. That is, the valve 10 switches the flow path for the exhaust gas 142 according to opening and closing.

The valve 10 is opened and closed by the pressure of the exhaust gas 142 or an actuator such as a well-known motor or thermoactuator. The main flow path 70 represents a flow path for the exhaust gas 142 configured in a tubular shape mainly by exhaust pipes 12 and 14, a holding member 24 (in particular, a linear portion 24A described below) and a valve seat support member 56.

The secondary flow path 71 mainly represents a flow path configured in a tubular shape by being surrounded by an outer shell member 20, a lid member 22, and the holding member 24. The secondary flow path 71 is a flow path branched from the main flow path 70 and is formed around the main flow path 70. In the present embodiment, particularly, the secondary flow path 71 is formed surrounding the main flow path 70.

The term "surrounding" includes the fact that at least a portion is covered. That is, the secondary flow path 71 needs not necessarily be disposed over the entire circumference of the main flow path. 70, and may be disposed so as to cover at least a portion of the main flow path 70.

In other words, the exhaust heat recovery device 1 has a coaxial structure. The coaxial structure indicates a configuration in which the center axis of the main flow path 70 coincides with the central axes of members formed annularly around the main flow path 70, such as the secondary flow path 71 and the heat exchanger 30.

[1-2. Structure of Exhaust Heat Recovery Device]

As shown in FIG. 2, the exhaust portion 2 is provided with the exhaust pipe 12. The exhaust pipe 12 is formed in a cylindrical shape with both ends opened. The exhaust pipe 12 is connected to an exhaust pipe, an exhaust manifold or the like into which the exhaust gas 142 from the internal combustion engine flows.

The shell member 4 comprises the exhaust pipe 14, the outer shell member 20, the lid member 22, and the holding member 24. The exhaust pipe 14 is formed in a cylindrical shape with both ends opened.

The outer shell member 20 is formed in a tubular shape with both ends opened and is formed in a cylindrical shape in which at least a portion thereof has an inner diameter larger than the diameter of the exhaust pipe 12. An end portion on the downstream side of the outer shell member 20 is connected to an upstream end 16 of the exhaust pipe 14.

The lid member 22 closes an opening between the downstream side in the exhaust pipe 12 and the upstream side of the outer shell member 20. The lid member 22 is formed integrally with an outer portion 22A, an intermediate portion 22B, and an inner portion 22C continuously connected.

The outer portion 22A is a portion having an annular surface orthogonal to the flow direction of the exhaust gas 142, and the outer circumferential portion is joined to the outer shell member 20. The inner portion 22C is located upstream of the outer portion 22A and is a portion having an annular surface orthogonal to the flow direction of the exhaust gas 142, and the inner circumferential portion is joined to the exhaust pipe 12.

The intermediate portion 22A has a curved surface along the flow direction of the exhaust gas 142 and is formed in a cylindrical shape. In the intermediate portion 22A, the upstream side is connected to the inner portion 22C, and the downstream side is connected to the outer portion 22A. The holding member 24 holds the heat exchanger 30 disposed in the heat exchange chamber 28.

The outer shell member 20, the lid member 22, and the holding member 24 form the heat exchange chamber 28 which is an annular space surrounded by them. An annular gap is formed between a downstream end portion in the exhaust pipe 12 and an upstream end portion in the holding member 24, and this gap constitutes the inflow portion 8. As shown in FIG. 2, the inflow portion 8 is a portion where the exhaust gas 142 flows from the exhaust portion 2 into the heat exchanger 30.

The heat exchanger 30 disposed in the heat exchange chamber 28 comprises, for example, a plurality of heat exchange cells 34 as shown in FIG. 2. Each of the plurality of heat exchange cells 34 has a liquid flow path through which the heat exchange medium 144 flows, and a plurality of heat exchange flow paths 32 are provided around the plurality of heat exchange cells 34. In the heat exchanger 30, at a contact portion between the heat exchange flow path 32 and the heat exchange cell 34, heat exchange is carried out between the exhaust gas 142 flowing through the heat exchange flow path 32 and the heat exchange medium 144 flowing through the heat exchange cell 34.

In the heat exchange chamber 28, a supply now path 38 and a discharge flow path 40 are provided. The supply flow path 38 is formed as an annular space surrounded by the holding member 24 and the heat exchanger 30 and is a flow path for supplying the flowing exhaust gas 142 to the plurality of heat exchange flow paths 32 while being branched.

The holding member 24 comprises a side surface portion 240 and a linear portion 24A. The side surface portion 240 is a portion located on a side surface of the heat exchanger 30 and having an annular surface orthogonal to the flow direction of the exhaust gas 142. A gap serving as a flow path for the exhaust gas 142 is formed between an outer circumferential portion of the side surface portion 240 and the outer shell member 20.

The linear portion 24A is continuously connected to the inner circumferential side of the side surface portion 240 and is formed in a tubular shape. The linear portion 24A is a wall portion facing the plurality of heat exchange flow paths 32 across the supply flow path 38 and functions as a partition wall separating the main flow path 70 and the secondary flow path 71. The linear portion 24A is configured to linearly extend inn cross section obtained by cutting the exhaust heat recovery device 1 on a virtual plane including the supply flow path 38 and the plurality of heat exchange flow paths 32 as shown in FIG. 2, for example.

The upstream end portion in the linear portion 24A is located upstream of the outer portion 22A of the lid member 22. Due to such a configuration of the holding member 24 and the lid member 22, the path of the exhaust gas 142 flowing in from the inflow portion 8 toward the heat exchange chamber 28 is defined by the inner portion 22C and the intermediate portion 22B. As a result, the flow direction of the exhaust gas 142 is substantially parallel to the linear portion 24A before reaching a branching portion with the plurality of heat exchange flow paths 32 in the supply flow path 38.

Although the linear portion 24A is linear in the cross-sectional view, the linear portion 24A itself has a tubular shape, so that the linear portion 24A is actually a curved surface.

In the supply flow path 38, the cross-sectional area of the flow path is set to be smaller toward the downstream side in the flow direction of the exhaust gas 142. In other words, the supply flow path 38 has a tapered shape in which the flow path becomes narrower as it goes away from the inflow portion 8. The cross-sectional area of the flow path indicates the area of the flow path when the flow path is cut on a plane orthogonal to the flow direction in the flow path.

Here, in a situation where the exhaust gas 142 is continuously supplied, when reaching the side surface portion 240, the pressure around the side surface portion 240 increases. Then, the pressure distribution is such that the pressure is relatively low on the upstream side of the supply flow path 38 and the pressure is relatively high on the downstream side. In a case where the cross-sectional area of the supply flow path 38 is set uniformly at any position in the flow direction of the exhaust gas 142, according to the pressure distribution described above, there is a tendency that, among the plurality of heat exchange flow paths 32, a larger amount of the exhaust gas 142 flows through the heat exchange flow paths 32 branched on the downstream side of the supply flow path 38.

However, as in the present embodiment, in the supply flow path 38, when the cross-sectional area of the flow path is set to be smaller toward the downstream side in the flow direction of the exhaust gas 142, as the cross-sectional area becomes smaller, ventilation resistance of the exhaust gas 142 is increased toward the downstream side, and therefore, it is possible to promote branching of the exhaust gas 142 to the plurality of heat exchange flow paths 32 on the upstream side. Thus, among the plurality of heat exchange flow paths 32, the inflow of the exhaust gas 142 to the heat exchange flow paths 32 branched on the downstream side of the supply flow path 38 is suppressed, and the flow rate of the exhaust gas 142 flowing through the plurality of heat exchange flow paths 32 can be made more uniform.

The discharge flow path 40 is formed as a space surrounded by the outer shell member 20 and the heat exchanger 30 and is a flow path for merging and discharging the heat-exchanged exhaust gas 142 having passed through the plurality of heat exchange flow paths 32. In the present embodiment, the cross-sectional area of the discharge flow path 40 is set to be uniform at any position in the flow direction of the exhaust gas 142. In the supply flow path 38 and the discharge flow path 40, the flow direction of the exhaust gas 142 is set to the same direction. That is, in FIG. 2, the right direction on the paper surface is set to the flow direction of the exhaust gas 142 in the supply flow path 38 and the discharge flow path 40, and this direction coincides with the flow direction of the exhaust gas 142 in the main flow path 70.

The heat exchange medium 144 flows into the heat exchanger 30 from the inflow pipe 44 penetrating the lid member 22, and after heat exchange is carried out inside the heat exchanger 30, the heat exchange medium 144 flows outside the heat exchanger 30 via the outflow pipe 46 penetrating the lid member 22. The inflow pipe 44 and the outflow pipe 46 may penetrate the outer shell member 20, not necessarily the lid member 22.

The valve 10 has at least the valve seat support member 56, a valve body 62, a valve seat 64, and a valve shaft 66. In the valve seat support member 56, the downstream side is connected to the holding member 24, and the valve seat 64 is provided on the upstream side.

The valve body 62 is a disk-shaped member having a diameter larger than the diameters of the valve seat support member 56 and the exhaust pipe 12. The valve shaft 66 is a shaft connected to the valve body 62 and is a shaft for driving the valve body 62.

The valve seat 64 is a member that comes into contact with the valve body 62 and thereby closes the valve seat support member 56. The valve seat 64 in the present embodiment is a distal end portion 58 of the valve seat support member 56. A mesh member 68 formed in a mesh shape is attached to an inner circumferential surface of the valve seat 64.

[1-3. Effects]

According to the first embodiment as detailed above in FIGS. 1 and 2, the following effects can be obtained.

(1a) The exhaust heat recovery device 1 described above comprises the heat exchanger 30, the supply flow path 38, and the discharge flow path 40. The heat exchanger 30 has the plurality of heat exchange flow paths 32 configured to carry out heat exchange between the exhaust gas 142 and a heat exchange medium. The supply flow path 38 is configured such that the exhaust gas 142 flows therethrough, and the flowing exhaust gas 142 is supplied to the plurality of heat exchange flow paths 32 while being branched.

The discharge flow path 40 is configured to merge and discharge the heat-exchanged exhaust gas 142 having passed through the plurality of heat exchange flow paths 32. At least one flow path of the supply flow path 38 and the discharge flow path 40 is configured to be narrower toward the downstream side in the flow direction of the exhaust gas 142.

According to the exhaust heat recovery device 1 thus configured, in at least one of the supply flow path 38 and the discharge flow path 40, the cross-sectional area of the flow path is set to be smaller toward the downstream side in the flow direction of the exhaust gas 142, and therefore, for example, as compared with the case where the cross-sectional area of the flow path is set uniformly, the flow rate difference of the exhaust gas 142 flowing through the plurality of heat exchange flow paths 32 can be reduced. Thus, the amount of the exhaust gas 142 flowing into the cell of the heat exchanger 30 can be optimized with a simple configuration.

(1b) Further, in the exhaust heat recovery device 1 described above, the cross-sectional area of the supply flow path 38 is set to be smaller toward the downstream side in the flow direction of the exhaust gas 142.

According to the exhaust heat recovery device 1 thus configured, the amount of the exhaust gas 142 flowing into the cell of the heat exchanger 30 can be reliably optimized with a simple configuration.

(1c) Further, in the exhaust heat recovery device 1 described above, the flow direction of the exhaust gas 142 in the supply flow path 38 may be set to the same direction as the flow direction of the exhaust gas 142 in the discharge flow path 40.

According to the exhaust heat recovery device 1 thus configured, the resistance to the flow generated when the flow direction of the exhaust gas 142 is changed can be minimized as much as possible.

(1d) In the exhaust heat recovery device 1 described above, at least one flow path of the supply flow path 38 and the discharge flow path 40 is provided with a wall portion facing the plurality of heat exchange flow paths 32, and a cross section of the wall portion comprises the linear portion 24A configured to extend linearly when the wall portion is cut on a virtual plane including the at least one flow path and the plurality of heat exchange flow paths 32. The term "extend" indicates that "being provided to extend".

According to the exhaust heat recovery device 1 thus configured, it is possible to facilitate design and processing in the linear portion 24A as compared with the configuration having a complex curved surface.

(1e) The exhaust heat recovery device 1 described above further comprises the main flow path 70 through which the exhaust gas 142 flows. The supply flow path 38 and the heat exchanger 30 are arranged to surround the circumference of the main flow path 70 and configured to allow introduction of at least a portion of the exhaust gas 142 flowing through the main flow path 70.

According to the exhaust heat recovery device 1 thus configured, it is possible to achieve the structure in which at least a portion of the exhaust gas 142 flowing through the main flow path 70 flows through the heat exchanger 30.

[2. Another Embodiment]

Although the embodiment for carrying out the present disclosure has been described above, the present disclosure is not limited to the above-described embodiment, and various modifications can be made.

(2a) In the above embodiment, although the cross-sectional area of the discharge flow path 40 is set to be uniform at any position in the flow direction of the exhaust gas 142, the present disclosure is not limited to the configuration in which the cross-sectional area of the discharge flow path 40 is uniform. For example, as shown in FIG. 3, the cross-sectional area of the discharge flow path 40 may be set to be smaller toward the downstream side in the flow direction of the exhaust gas 142.

Figure 3:
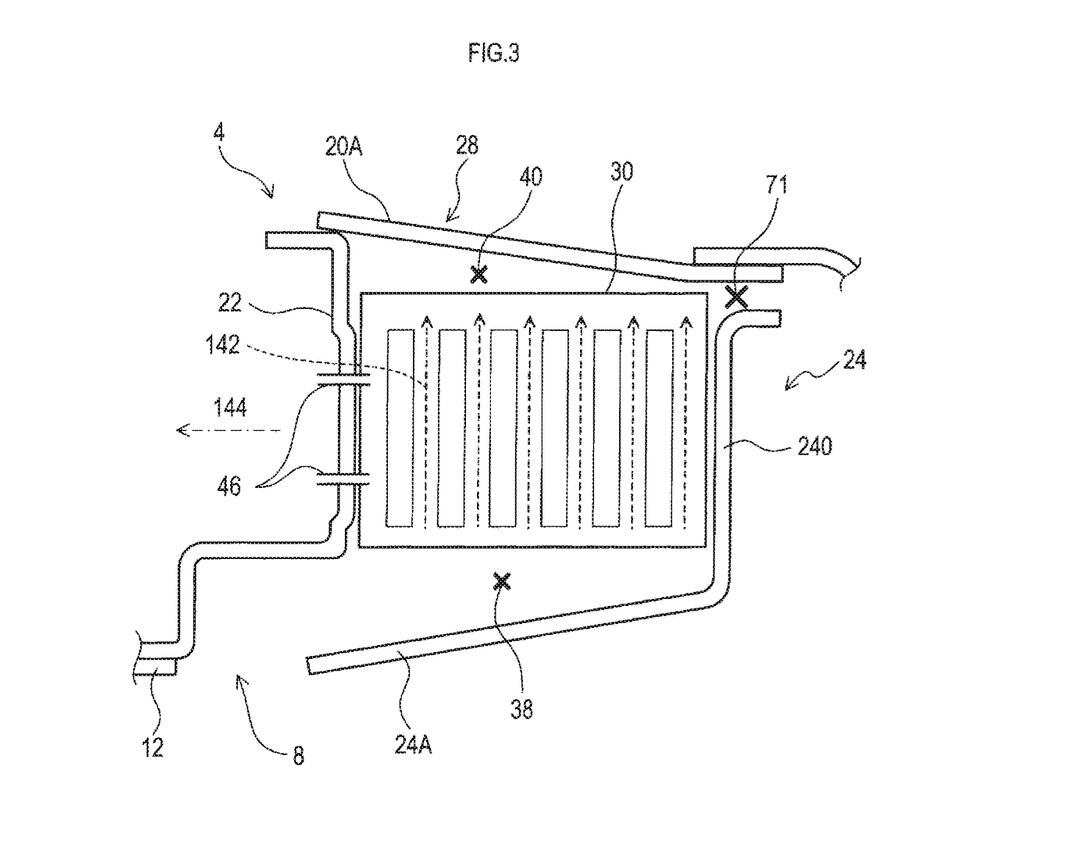
FIG. 3 is a cross-sectional view around a heat exchanger of another embodiment (part 1).

That is, in the outer shell member 20 shown in FIG. 3, a gap with the heat exchanger 30 may be narrower toward the downstream side of the exhaust gas 142. Specifically, a linear portion 20A is provided as a wall portion facing the plurality of heat exchange flow paths 32 across the discharge flow path 40, A cross section of the linear portion 20A is configured to be linear when the wall portion is cut on the virtual plane including the at least one flow path and the plurality of heat exchange flow paths 32. Even in this case, since the ventilation resistance of the exhaust gas 142 increases by the amount that the flow path becomes narrower toward the downstream side of the discharge flow path 40, the branching of the exhaust gas 142 to the plurality of heat exchange flow paths 32 can be promoted on the upstream side.

Thus, among the plurality of heat exchange flow paths 32, the inflow of the exhaust gas 142 to the flow paths branched on the downstream side of the supply flow path 38 is suppressed, and the flow rate of the exhaust gas 142 flowing through the plurality of heat exchange flow paths 32 can be made more uniform. In the case of such a configuration, the cross-sectional area of the supply flow path 38 may be set uniformly at any position in the flow direction of the exhaust gas 142.

Figure 4:
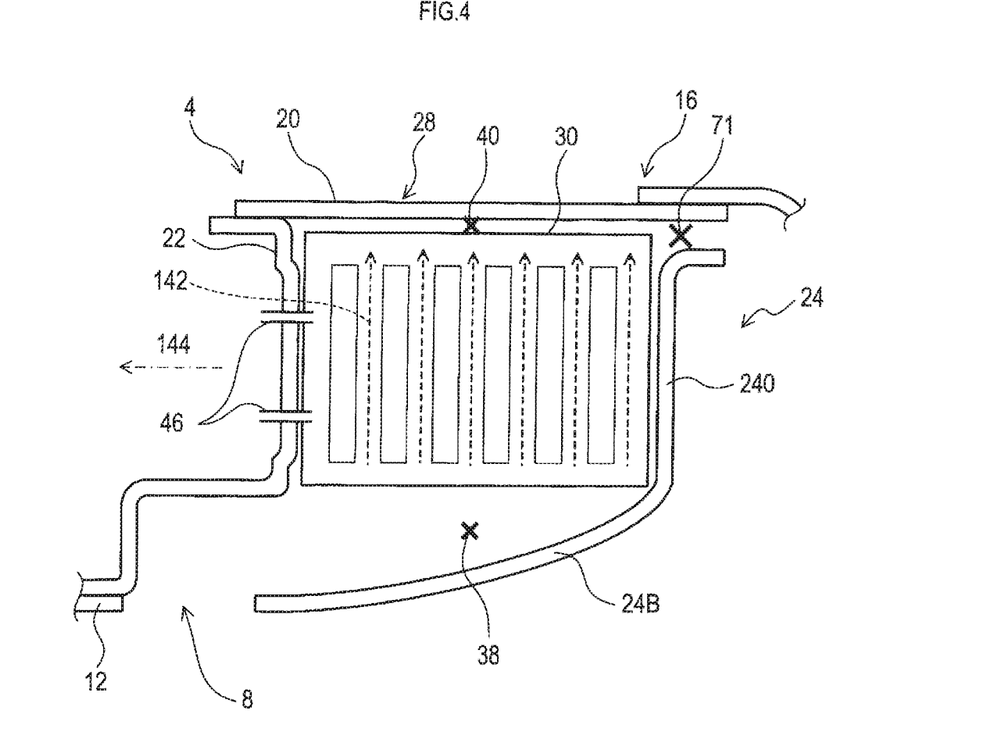
FIG. 4 is a cross-sectional view around a heat exchanger of another embodiment (part 2).

(2b) In the above embodiment, although the holding member 24 constituting the supply flow path 38 comprises the linear portion 24A configured to be linear when the exhaust heat recovery device 1 is cut on the virtual plane including the supply flow path 38 and the plurality of heat exchange flow paths 32, the holding member 24 may comprise a curved portion 24B configured such that a wall portion facing the plurality of heat exchange flow paths 32 extends in a curved shape, as shown in FIG. 4.

According to such an exhaust heat recovery device, the curved portion 24B is set according to the flow characteristics of the exhaust gas 142, whereby the flow rate of the exhaust gas 142 flowing through the plurality of heat exchange flow paths 32 can be made more uniform.

Figure 5:
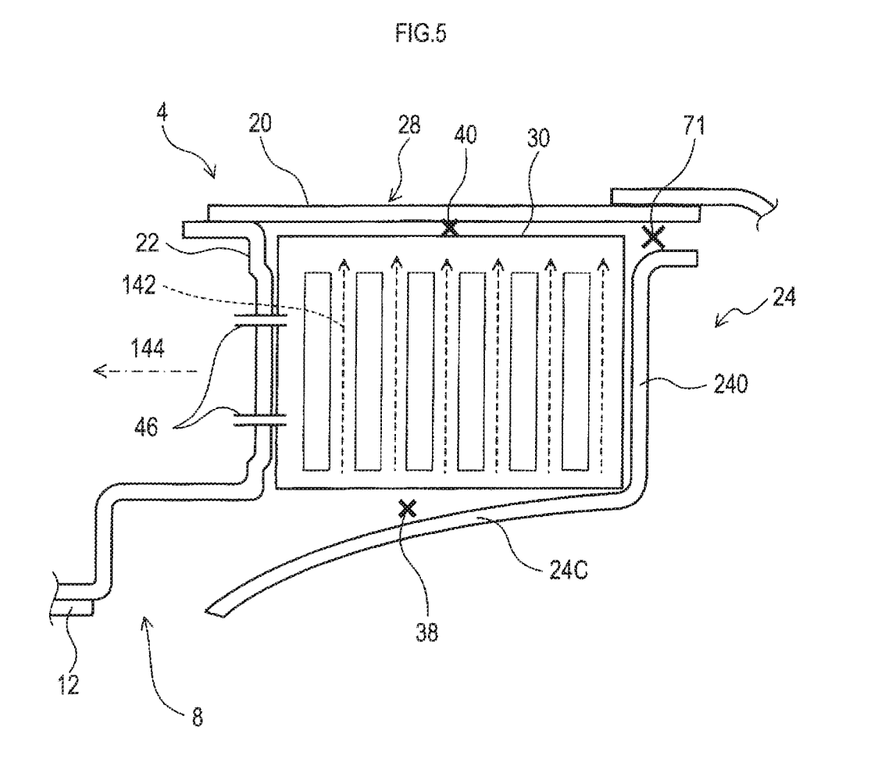
FIG. 5 is a cross-sectional view around a heat exchanger of another embodiment (part 3).

As shown in FIG. 4, in the curved portion 24B thus configured, a degree of curvature such as the curvature of the curved portion 24B may be set according to an exponential function. As shown in FIG. 5, in the holding member 24, the degree of curvature of a curved portion 24C may be set according to the exponential function.

Figure 6:
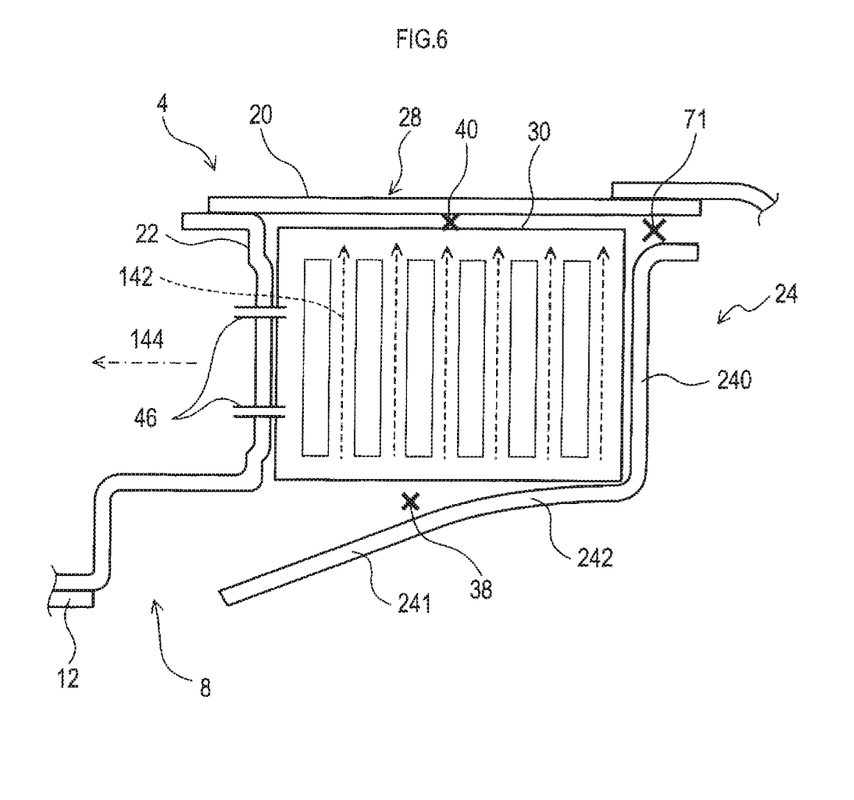
FIG. 6 is a cross-sectional view around a heat exchanger of another embodiment (part 4).

As shown in FIG. 6, the holding member 24 may be provided with a combination of a linear portion 241 similar to the linear portion 24A described above and a curved portion 242 similar to the curved portions 24B and 24C described above.

Even in such a case, the same effect as in (lad described above can be obtained.

(2c) The functions of one constituent element in the above embodiment may be dispersed as a plurality of constituent elements, or the functions of a plurality of constituent elements may be integrated to one constituent element. Further, some configurations of the above embodiment may be omitted. Furthermore, at least some configurations of the above embodiment may be added to or replace configurations of another above-described embodiment. All aspects included in the technical concept identified solely by the expressions recited in the claims are embodiments of the present disclosure.

(2d) In addition to the exhaust heat recovery device 1 described above, the present disclosure can be realized in various forms such as a system comprising the exhaust heat recovery device 1 as a component and an exhaust heat recovery method.

The invention claimed is:

1. An exhaust heat recovery device comprising:
a main flow path configured such that exhaust gas flows therethrough;
a heat exchanger arranged to surround a circumference of the main flow path, the heat exchanger having a plurality of heat exchange flow paths configured to allow introduction of at least a portion of the exhaust gas flowing through the main flow path, the plurality of heat exchange flow paths being configured to carry out heat exchange between the portion of the exhaust gas and a heat exchange medium;
a supply flow path arranged to surround the circumference of the main flow path, the supply flow path being configured to allow introduction of the at least a portion of the exhaust gas flowing through the main flow path, and the supply flow path being configured such that the portion of the exhaust gas flows therethrough, and the flowing exhaust gas is supplied to the plurality of heat exchange flow paths while being branched;
a discharge flow path configured to merge and discharge the heat-exchanged exhaust gas having passed through the plurality of heat exchange flow paths;
a wall portion arranged to surround the circumference of the main flow path, the wall portion facing the plurality of heat exchange flow paths across the supply flow path; and
a valve configured to open and close the main flow path,
wherein the supply flow path is configured to be narrower toward a downstream side in a flow direction of the exhaust gas through the supply flow path, and
wherein the wall portion is formed in a tubular shape so as to widen the main flow path toward a downstream side in a flow direction of the exhaust gas through the main flow path.

2. The exhaust heat recovery device according to claim 1, wherein the flow direction of the exhaust gas in the supply flow path is set to the same direction as the flow direction of the exhaust gas in the discharge flow path.

3. The exhaust heat recovery device according to claim 1, wherein a cross section of the wall portion when the wall portion is cut on a virtual plane including the supply flow path and the plurality of heat exchange flow paths comprises a linear portion configured to extend linearly.

4. The exhaust heat recovery device according to claim 1, wherein a cross section of the wall portion when the wall portion is cut on a virtual plane including the supply flow path and the plurality of heat exchange flow paths comprises a curved portion configured to extend in a curved shape.

5. The exhaust heat recovery device according to claim 2, wherein a cross section of the wall portion when the wall portion is cut on a virtual plane including the supply flow path and the plurality of heat exchange flow paths comprises a linear portion configured to extend linearly.

6. The exhaust heat recovery device according to claim 2, wherein a cross section of the wall portion when the wall portion is cut on a virtual plane including the supply flow path and the plurality of heat exchange flow paths comprises a curved portion configured to extend in a curved shape.

* * * * *